March 10, 1970 C. B. ELLIS ET AL Re. 26,819

HERMETIC COMPRESSOR PRESSURE SWITCH

Original Filed Oct. 24, 1965

INVENTORS

CHARLES B. ELLIS

BY SANFORD BROWN

Bair, Freeman & Molinare

United States Patent Office

Re. 26,819
Reissued Mar. 10, 1970

26,819

HERMETIC COMPRESSOR PRESSURE SWITCH

Charles B. Ellis and Sanford Brown, Fort Worth, Tex., assignors to Lennox Industries Inc., a corporation of Iowa Original No. 3,383,031, dated May 14, 1968, Ser. No. 504,328, Oct. 24, 1965. Application for reissue July 1, 1968, Ser. No. 746,214

Int. Cl. F04b *49/02*

U.S. Cl. 230—17 1 Claim

Matter enclosed in heavy brackets [ ] appears in the original patent but forms no part of this reissue specification; matter printed in italics indicates the additions made by reissue.

*ABSTRACT OF THE DISCLOSURE*

*A reciprocating compressor including compression mechanism housed within a hermetically enclosed casing, the compression mechanism having a discharge gas cavity therein, and a discharge gas pressure switch in the discharge gas cavity for sensing discharge gas pressure at its source and terminating operation of the compressor motor upon attainment of a predetermined gas pressure in the discharge gas cavity.*

This invention relates to a high-pressure motor control means for a hermetic refrigerant compressor and, more particularly, to a high-pressure control switch affixed on a resiliently mounted cylinder block within a sealed housing, such control switch being in communication with the discharge gas muffling chamber formed in the cylinder block for sensing discharge gas pressure at its source.

Safety controls are provided on modern day hermetic refrigerant compressors to protect such compressors under all conditions of voltage, ambience and load without unnecessary shutdown due to false sensing of temperature or pressure conditions. A control commonly utilized is a high-pressure safety cutout switch that is operative to cut off the power to the motor in case the condensing pressure or discharge gas pressure exceeds a predetermined limit. Heretofore, the high-pressure switch has been mounted externally of the compressor. A common high-pressure switch comprises an electrical switch actuated by a pressure bellows connected through capillary-type tubing directly to the refrigerant discharge line. With such conventional pressure control, the capillary tube bleeding from the discharge line to the switch mechanism might break, permitting refrigerant to be lost to the atmoshpere. Similarly, if the bellows within the pressure switch ruptured, refrigerant would be lost to the atmosphere. Such constructions were further undesirable inasmuch as they were susceptible to tampering.

An object of the present invention is to provide a hermetic compressor with a high-pressure control switch that is carried on the cylinder block within the sealed outer housing and communicates with the discharge gas muffling chamber formed in the cylinder block for sensing discharge gas pressure at its source.

Another object of the present invention is to provide a high-pressure control switch means for a hermetic compressor which may be mounted integrally within the compressor so as to be free from tampering, such high-pressure control switch means being constructed and arranged so as to prevent leakage of discharge gas to the suction side of the refrigeration system in the event there were leakage in the switch. Other objects and advantages of the present invention will be more readily perceived from the following description.

The attached drawing illustrates a preferred embodiment of the invention in which.

Figure 1:
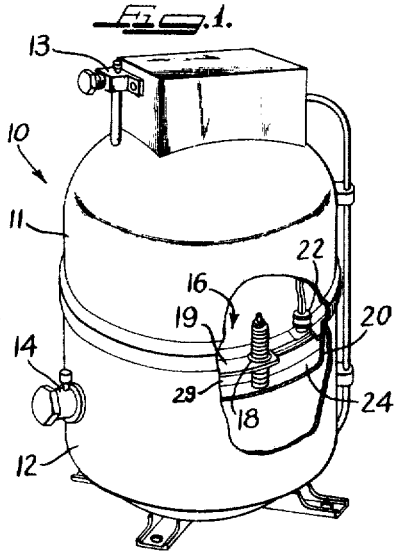
FIGURE 1 is a perspective view of a hermetic refrigerant compressor, with a portion of the casing being broken away to illustrate the location of the high-pressure control switch within the compressor.

Referring to FIGURE 1, there is illustarted a refrigerant compressor 10 which comprises an outer casing enclosing both the compressor motor and the compression mechanism. An upper shell 11 and a lower shell 12 are suitably joined together to form the hermetic outer casing. The compressor 10 is adapted to be connected to a refrigerant circuit by means of a discharge gas fitting 13 and a suction gas fitting 14.

The compression mechanism 16 is resiliently supported within the outer casing by means of a plurality of spring means 18, which function between a flange 19 on the annular sleeve 29 defining a part of the compression mechanism and a coacting flange on a mounting ring 20 mounted on the interior of the outer casing. Reference may be made to the copending application of Sidney A. Parker, Ser. No. 395,001, now Patent No. 3,250,461, filed Sept. 8, 1964, for a more detailed explanation of the compression mechanism and the mounting means therefor.

From FIGURE 1, it is seen that the high-pressure control switch 22 of the present invention is disposed within the outer casing of compressor 10 and is integrally carried on the compression mechanism in communication with the discharge gas muffling chamber 24 defined therewithin.

Figure 2:
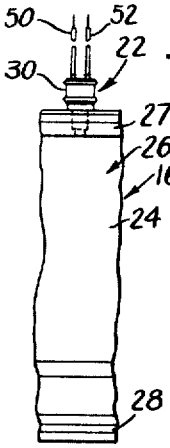
FIGURE 2 is a fragmentary side view of the cylinder block, illustrating the location of the high-pressure control switch on the cylinder block.

Turning now to FIGURE 2, it will be seen that the compression mechanism 16 includes a compressor block or body 26 having an upper peripheral flange 27 and a lower peripheral flange 28 defined thereon and an annular shield or sleeve 29, preferably made from metal, that cooperates with the annular flanges 27 and 28 on the compressor block to define the discharge gas muffling chamber 24 about the compressor block 26. Within the block 26, are reciprocating pistons which are operatively connected to a drive shaft or crankshaft driven by the compressor motor in usual fashion.

The high-pressure control switch 22 comprises a housing 30 having a reduced portion 32 that is externally threaded for engagement with a threaded opening 23 in the upper flange 27. O-ring seal means 36 are provided about the reduced portion 32 between the body 30 and the flange to prevent the escape of discharge gas from within the discharge gas muffling chamber 24. There is a passage 37 extending through the reduced portion 32 of the body 30 for communicating discharge gas pressure to the chamber 38 within the body 30. The flexible bellows or diaphragm member 40 separates the chamber 38 from the chamber 42 within the body 30. The member 40 may be fabriacted from thin sheet metal or from a suitable plastic or composition material having the requisite strength and resistance to refrigerant and oil commonly used in refrigerant compressors.

Figure 3:
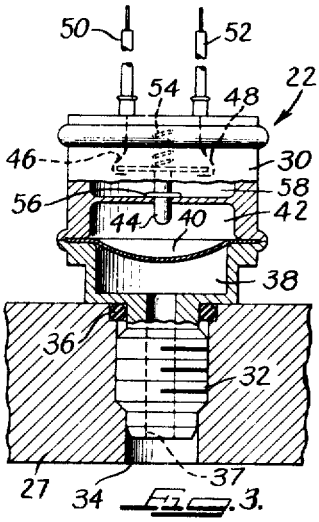
FIGURE 3 is an enlarged cross-sectional view of the high-pressure control switch illustrating the connection of the switch to the upper flange on the cylinder block.

When the pressure within the chamber 38 exceeds the pressure within the chamber 42, the diaphragm 40 will be moved upwardly against the plunger 44, causing movement of plunger 44 upwardly to [close] *open* a circuit between the contacts 46 and 48, which are connected to lead wires 50 and 52, respectively. The plunger 44 may be biased [away from] *toward* the closed position by gravity or by the spring 54 shown schematically in FIGURE 3.

Thus, when the force urging plunger 44 upwardly is less than the force urging the plunger downwardly, the plunger 44 will move [away from] *toward* engagement with contacts 46 and 48. The spring 54 will bias the plunger downwardly to the position indicated in FIGURE 3. Collar or stop member 56 on the plunger 44 will maintain the plunger in place within the chamber 68 of switch body 30 and will limit the plunger movement [away from the contacts 46 and 48].

Figure 4:
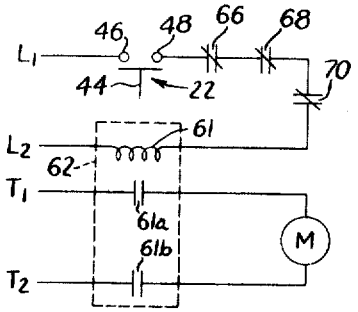
FIGURE 4 is a schematic wiring diagram of an electrical control system for a compressor motor employing the high-pressure control switch of the present invention.

Referring now to FIGURE 4, there is illustarted a schematic wiring diagram utilizing the high-pressure control switch of the present invention. The compressor motor M is connected to the line $T_1$ and $T_2$, which are in turn connected to a power source. The supply of power to the motor M is interrupted when the contacts 61a and 61b of the compressor motor start coil 62 are opened upon actuation of the relay 61.

The contactor relay 61 is disposed in a pilot circuit or low voltage circuit which is connected to a suiatble source of low voltage by the lines $L_1$ and $L_2$. Provided in circuit with the contactor relay 61 in addition to the high-pressure control switch 22 may be a suitable low-pressure control switch 66, an external motor overload 68 and an in-winding thermostat 70. The pressure switch 68 is adapted to sense suction line pressure and is adapted to close the electrical circuit on rising pressure and to open the electrical circuit on falling pressure. The external overload switch 68 is disposed externally of the compressor and is responsive to current overload to terminate operation of the compressor motor M. The thermostat or protective device 70 is preferably mounted on the stator slots or on the windings of the compressor motor for fast response to motor winding temperature.

Upon opening of any one of the normally closed switches in the pilot circuit, *for example, switch 22 is shown open in FIG. 4,* the contactor relay 61 will be de-energized, thus opening the contacts 61a and 61b to terminate operation of the compressor motor.

The high-pressure control switch 22 of the present invention is integrally connected to the compression mechanism within the outer casing of the compressor so as to detect discharge gas pressure at its source. The high-pressure control switch is entirely within the sealed outer housing of the compressor and is, therefore, tamper-proof Further, it is noted that in the event the bellows or diaphragm 40 should rupture, there will be no escape of discharge gas from the discharge gas muffling chamber. The discharge gas cannot, therefore, escape to the ambient, nor can it become mixed with the suction gas contained in the compressor between the compression mechanism and the outer casing. Thus, there has been provided a reliable, tamper-proof, high-pressure control switch for controlling the compressor motor that is carried on the compression means within the compressor at the source of discharge gas pressure.

While there has been shown and described a particular embodiment of this invention, it will be obvious to those skilled in the art that various changes and modifications may be made therein without departing from the invention. Therefore, it is intended in the appended claim to cover all such changes and modifications as fall within the true spirit and scope of the invention.

We claim:

1. In a reciprocating compressor of the type having compressor block means resiliently mounted within a hermetically enclosed casing and an electric motor driven compressor mechanism in said block means, said compressor block means defining an annular discharge gas cavity therein, the improvement comprising a discharge gas pressure sensing means on said compressor block means entirely within said casing so as to be tamper-proof and disposed in said discharge gas cavity for sensing the pressure of said discharge gas at its source, said discharge gas pressure sensing means being operatively connected to said electric motor driving the compression mechanism of the compressor for terminating operation of the electric motor upon attainment of predetermined high discharge gas pressure, said discharge gas pressure sensing means comprises a sealed housing secured to said compressor block means in an opening therein, said housing being sealed in said opening, switch means within said housing, diaphragm means resistant to adverse reaction with refrigerant and oil in the compressor disposed within said housing responsive to discharge gas pressure in said discharge gas cavity and movable to actuate said switch means to control operation of said electric motor.

References Cited

The following references, cited by the Examiner, are of record in the patented file of this patent or the original patent.

UNITED STATES PATENTS

| | | | |
|---|---|---|---|
| 1,881,862 | 10/1932 | Macey | 200—83.5 |
| 2,435,143 | 1/1948 | Knauth | 200—83.5 |
| 2,518,597 | 8/1950 | Brooks | 230—17 X |
| 2,940,395 | 6/1960 | Hill | 103—25 |
| 3,102,677 | 9/1963 | Evans et al. | 230—17 X |
| 3,132,592 | 5/1964 | Rudy et al. | 103—25 |
| 3,167,293 | 1/1965 | Stenger et al. | 230—17 X |
| 3,278,111 | 10/1966 | Parker | 230—17 |

WILLIAM L. FREEH, Primary Examiner